(12) United States Patent
Mogamiya et al.

(10) Patent No.: US 7,057,642 B2
(45) Date of Patent: Jun. 6, 2006

(54) ELECTRONIC CAMERA WITH DEVICE FOR ELIMINATING STATIC ELECTRIC CHARGES FROM OPTICAL ELEMENT

(75) Inventors: Makoto Mogamiya, Tokyo (JP); Masahiro Fushimi, Tokyo (JP)

(73) Assignee: PENTAX Corporation, Tokyo (JP)

( * ) Notice: Subject to any disclaimer, the term of this patent is extended or adjusted under 35 U.S.C. 154(b) by 783 days.

(21) Appl. No.: 09/880,071

(22) Filed: Jun. 14, 2001

(65) Prior Publication Data

US 2001/0055072 A1    Dec. 27, 2001

(30) Foreign Application Priority Data

Jun. 15, 2000    (JP)    .............................. 2000-180040

(51) Int. Cl.
*H04N 5/225*    (2006.01)
(52) U.S. Cl. .................................. 348/207.99; 348/374
(58) Field of Classification Search ................ 348/374, 348/241, 335, 207.99; 15/1.51; 396/661; 361/211
See application file for complete search history.

(56) References Cited

U.S. PATENT DOCUMENTS 5,828,918 A * 10/1998 Abe et al. ................... 396/439
6,543,078 B1 * 4/2003 Ernst et al. ................... 15/1.51
2002/0180880 A1 * 12/2002 Bean et al. ................. 348/335

FOREIGN PATENT DOCUMENTS

| JP | 09130654 A | * | 5/1997 |
| JP | 11243187 | | 9/1999 |
| JP | 11282047 | | 10/1999 |
| JP | 2000029132 A | * | 1/2000 |
| JP | 2001298640 A | * | 10/2001 |

* cited by examiner

*Primary Examiner*—Ngoc-Yen Vu
*Assistant Examiner*—Timothy J. Henn
(74) *Attorney, Agent, or Firm*—Greenblum & Bernstein, P.L.C.

(57) ABSTRACT

An electronic camera is provided that prevents deterioration of quality of an object image obtained by an image-pickup device due to dust adhered on an optical element. The electronic camera includes an ion generator for taking off the electric charges from the optical element, such as a low-pass filter, arranged in front of the image-pickup device. The ion generator is provided in the camera body and ionizes the air inside the camera body. The ionized air diffuses toward the low-pass filter and binds with the charge on the low-pass filter. Thus, the electric charge of the low-pass filter is taken off and the low-pass filter does not attract dust which cause the quality decrease of the object's image obtained by the image-pickup device.

25 Claims, 7 Drawing Sheets

ELECTRONIC CAMERA WITH DEVICE FOR ELIMINATING STATIC ELECTRIC CHARGES FROM OPTICAL ELEMENT

BACKGROUND OF THE INVENTION

The present invention relates to an electronic camera having an image-pickup device that converts an image of an object into electric signals.

Recently, electronic still cameras and video cameras that electronically stores still images and animated images in memories have become popular. In these electronic cameras, a photographing lens system forms an image of the object on a light receiving surface of an image-pickup device, e.g., a CCD image sensor. The image-pickup device has a plurality of pixels arrayed in a lattice pattern, i.e., the pixels are arrayed at constant interval in both vertical and horizontal directions on the light receiving surface thereof. These pixels convert the optical image formed on the light receiving surface into electrical signals and the electrical signals obtained are further converted from analog to digital and then stored in a recording medium as image data.

Such an electronic camera often includes a low-pass filter and/or an infrared-absorbing filter between the photographing lens system and the image-pickup device.

A moiré appears in the image obtained by the image-pickup device when the image has a spatial frequency close to the spatial sampling frequency of the image-pickup device, which is defined by the interval of the pixels arrayed in the lattice pattern as mentioned above. The low-pass filter is disposed in front of the image-pickup device to attenuate the spatial frequency components close to the sampling frequency of the image-pickup device so that the moiré is prevented.

The low-pass-filter is formed as a single optical filter by sticking together a plurality of birefringent plates made from crystal or lithium niobate. The low-pass filter splits an incident ray of light into four rays, two spaced apart in the lateral direction and the other two spaced apart in the vertical direction. In other words, the low-pass filter splits the incident ray in the directions in which the pixels of the image-pickup device are arrayed. Accordingly, four identical images of the object are formed on the light receiving surface overlapping to each other. The thickness of the low-pass filter is arranged such that the spaced images are spaced apart to each other with a displacement equal to the distance between the pixels. Thus the resulting image formed on the light receiving surface is slightly blurred so that the spatial frequency of the image is attenuated in the range near to half of the sampling frequency of the image-pickup device.

The infrared-absorbing filter is disposed in the passage of the light incident on the image-pickup device to eliminate the infrared components from the light. This is necessary since the image-pickup device has a different spectral sensitivity in comparison with the human eye's and receives not only visible radiation but also infrared radiation.

The optical filters, i.e., the low-pass filter and the infrared-absorbing filter, tend to collect dust on their surfaces due to static electricity. Especially low-pass filters made from a ferroelectric crystal having a pyroelectricity, like lithium niobate, for example, collect dust easily since polarization charges are generated even under small temperature change. Such dust decreases the quality of the image formed on the image-pickup device.

The dust may also adhere on the light receiving surface of the image-pickup device due to static electricity when the filter is not affixed on the light receiving surface but disposed such that a gap exists between the filter and the light receiving surface. Such dust also decreases the quality of the image obtained by the image-pickup device.

It may be possible to remove the dust from the filters or light receiving surface of the image-pickup device by blowing air using a blower or spray, or wiping the dust off with clothes. However, it is not easy to remove the dust completely by such methods since the dust removed are pulled back to the filters and/or image-pickup sensor by the electric attraction if the filters and/or image-pickup device are electro-statically charged.

SUMMARY OF THE INVENTION

It is therefore an object of the invention to provide an improved electrical camera that prevents deterioration of quality of the object image formed on the image pickup device due to static electric charge of the optical element inside the camera body.

For the above object, according to the present invention, there is provided an electronic camera that includes at least one optical element disposed in the electronic camera, and a charge eliminating device for eliminating the static electric charges from the optical element.

With the above constituted electronic camera, the charge eliminating device prevents the adhesion of dust on the optical elements, and thus also prevents the deterioration of the quality of the object image formed by the light passing through the optical element, by eliminating the static electric charges from the optical elements.

The electronic camera may include a manually operable switch, and a controller for controlling the charge eliminating device to operate in response to operation of the manually operable switch. The manually operable switch may be a switch for initiating a predetermined operation related to image capture, such as a shutter release button. The electronic camera may further include an image-pickup device for converting an object image formed thereon into electrical signals, and the shutter release button may have first and second positions to which it is pushed down. The charge eliminating device may operate when the shutter release button is pushed down to the first position, while the image-pickup device operates when the shutter release button is pushed down to the second position.

The charge eliminating device may include an ion generator for ionizing the air inside the electronic camera.

In this case, the electronic camera may further include a stirring mechanism for stirring the air inside the electronic camera such that the ionized air is stirred by the stirring mechanism and spreads toward the optical element. The electronic camera may be a single-lens reflex camera having a quick return mirror, and the stirring mechanism may include the quick return mirror and actuate the quick return mirror for stirring the air inside the electronic camera. It is preferable that the ion generator has an opening facing toward the stirring mechanism such that the ionized air diffuses from the opening toward the stirring mechanism.

Alternatively, the electronic camera may include an image-pickup device for converting an object image formed thereon into electrical signals, and a mechanical shutter for controlling the exposure time of the image-pickup device, disposed between the optical element and the charge eliminating device, and opened while the charge eliminating device operates. Also in this case, the electronic camera may further include a stirring mechanism for stirring the air inside the electronic camera, such that the ionized air spreads through the mechanical shutter toward said optical element. The electronic camera may be a single-lens reflex camera having a quick return mirror, and the stirring mechanism may include the quick return mirror and actuate the quick return mirror for stirring the air inside the electronic camera.

Instead of being an ion generator, the charge eliminating device may include a conductive member to ground the optical element. For example, the charge eliminating device may include a brushing device having a conductive and grounded brush, which traverses over a surface of the optical element while keeping contact with the optical element.

In this case, the electronic camera may further include a manually operable switch, and a controller for controlling the brushing device to move the brush across the surface of the optical element in response to operation of the manually operable switch. The brush may be located in a position, when the manually operable switch is not operated, where the brush contacts the optical element and is out of a passage of a light for forming an object image to be taken as a picture.

The optical element may be made from ferroelectric material. The optical element may an optical low-pass filter, an infrared-absorbing filter, or an image-pickup device.

DETAILED DESCRIPTION OF THE EMBODIMENTS

Herein after, digital cameras according to first to third embodiments of the present invention will be described with reference to the accompanying drawings.

Figure 1:
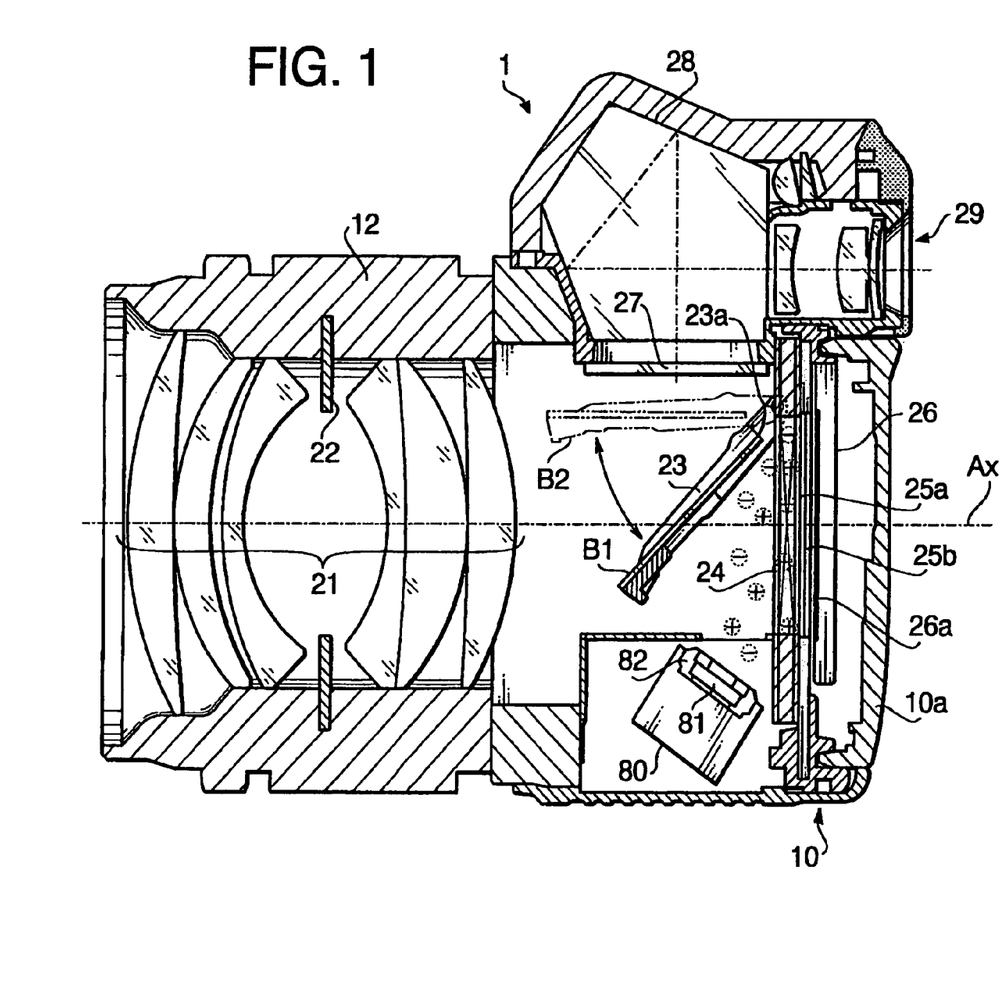
FIG. 1 is schematically shows a cross-section of a digital camera according to a first embodiment of the present invention.

FIG. 1 schematically shows a cross-section of a digital camera 1 according to the first embodiment of the present invention.

As shown in FIG. 1, the digital camera 1 has a camera body 10, and an interchangeable lens barrel 12 mounted on a front side of the camera body. The front side is the side which faces an object when a picture is taken.

The lens barrel 12 is provided with a photographing lens system 21, and an aperture member 22 which is disposed between the lenses of the photographing lens system 21.

A CCD image sensor 26, which serves as an image-pickup device, is disposed in front of a back cover 10a of the camera body 10. The CCD image sensor 26 is arranged in the camera body 10 such that its light receiving surface 26a faces the lens system 21, and an optical axis Ax of the lens system 21 crosses perpendicularly to the light receiving surface 26a, preferably, at its center.

A focal plane shutter 24 is provided in front of the CCD image sensor 26. The focal plane shutter 24 transfers a slit formed between the leading blind and the trailing blind with a predetermined speed such that the slit traverses in front of the light receiving surface 26a. In this manner, the focal plane shutter 24 allows the light coming through the picture-taking lens system 21 to reach the light receiving surface 26a.

A low-pass filter 25a and an infrared-absorbing filter 25b are provided between the focal plane shutter 24 and the CCD image sensor 26. The infrared-absorbing filter 25b is disposed adjacent and in parallel to the light receiving surface 26a so that it covers the light receiving surface 26a. The low-pass filter 25a is disposed on the front side (i.e., the left-hand side in FIG. 1) of the infrared-absorbing filter 25b, in parallel to the light receiving surface 26a. Accordingly, the light incident on the CCD image sensor 26 passes through both the low-pass filter 25a and the infrared-absorbing filter 25b. The low-pass filter attenuates the spatial frequency component of the light in the range near to the half of the sampling frequency of the image-pickup device. Further, The infrared-absorbing filter 25b eliminates the infrared component from the light. [SF1]

A quick return mirror 23 is provided between the photographing lens system 21 and the focal plane shutter 24, and a pentagonal prism 28 is provided in the camera body 10 above the quick return mirror 23. Further, a focusing screen 27 is provided parallel and closely to the bottom of the pentagonal prism 28 at an optically equivalent location to the light receiving surface 26a.

A shaft 23a is provided in the camera body 10 rotatably such that a longitudinal axis of the shaft 23a is parallel to both the focusing screen 27 and the light receiving surface 26a. The shaft 23a is arranged rotatable about the longitudinal axis, and one end of the quick return mirror 23 is engaged to the shaft 23a. The quick return mirror 23 rotates about the axis integrally with the shaft 23a between position B1, shown by solid line, and position B2, shown by phantom line. A motor (not shown) is further provided in the digital camera 1, for driving the quick return mirror 23 up and down between the positions B1 and B2.

The quick return mirror 23, when located at position B1, crosses the optical axis Ax and reflects the light coming through the lens system 21 towards the pentagonal prism 28. The reflected light forms an image of the object on the focusing screen 27. The pentagonal prism 28 reflects the image formed on the focusing screen 27 toward an eye piece system 29 provided to the back side (i.e., the right-hand side in FIG. 1) of the pentagonal prism 28. Thus, the image of the object can be observed through the eye piece system 29.

At position B2, the quick return mirror 23 is located directly below the pentagonal prism 28, and parallel to optical axis Ax. When the quick return mirror 23 is located at position B2, the light coming through the lens system 21 reaches the light receiving surface 26a.

An ion generator 80 that ionizes the air is provided in the camera body 10. Preferably, the ion generator 80 is disposed closely to the low-pass filter 25a and/or infrared-absorbing filter 25b, so that it can rapidly provide the surface of the low-pass filter 25a and/or infrared-absorbing filter 25b with ionized air. In the present embodiment, the ion generator 80 is disposed in front of the focal plane shutter 24, and below the quick return mirror 23.

Figure 2:
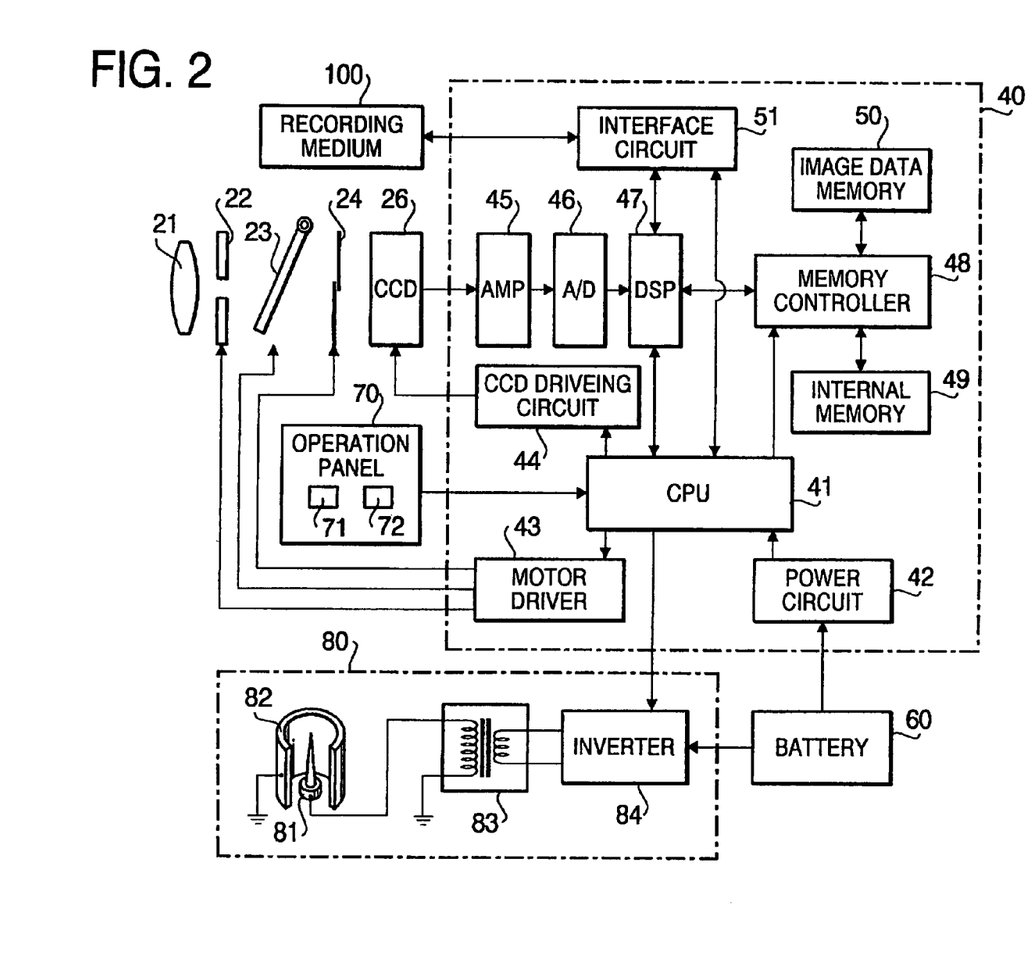
FIG. 2 shows a block diagram of the digital camera according to the first embodiment of the present invention.

The ion generator 80 includes a ground electrode 82 which is formed practically in cylinder shape, and a needle-shaped electrode 81 provided at the center of the ground electrode 82 with its central axis aligned to the central axis of the ground electrode 82. The ion generator 80 further includes a high voltage circuit 83 and an inverter 84, which are shown in FIG. 2.

The ion generator 80 is disposed in the camera body 10 such that the tip of the needle-shaped electrode 81 is directed toward the low-pass filter 25 and/or the infrared-absorbing filter 25b. In such arrangement, an opening defined at the top of the electrode 82 faces toward the low-pass filter 25a and/or the infrared absorbing filter 25b FIG. 2 shows a block diagram of the digital camera 1. The digital camera 1 includes, further to the elements shown in FIG. 1, an inner circuit 40, an operation panel 70, and a recording medium 100. The digital camera 1 also includes a battery 60 for supplying power to components in the digital camera 1. The battery 60 may be a secondary cell removable from the camera body 10.

The inner circuit 40 includes an internal memory 49 for storing programs and data to be executed and referred to, respectively, by CPU 41, an image data memory 50 for storing image data, and a memory controller 48 for writing/reading data on/from the internal memory 49 and the Image data memory 50.

The inner circuit 40 further includes a CCD driving circuit 44, an amplifier 45, an A/D (Analogue to Digital) converter 46, and a DSP (Digital Signal Processor) 47.

The CCD driving circuit 44 controls the actuation of the CCD image sensor 26 so that the CCD image sensor 26 converts the optical image of the object formed on light receiving surface 26a into electric analogue signals and sends the analogue signals to the amplifier 45. The amplifier 45 amplifies the analogue signals from the CCD image sensor 26, and transmits them to the A/D converter 46. The A/D converter 46 converts the analogue signals to digital signals and transmits them to the DSP 47. DSP 47 performs shading control, gamma control, picture reduction or enlargement, etc. The memory controller 48 stores the digital data after the DSP 47 has performed the above mentioned processes.

The inner circuit 40 further includes a power circuit 42, a motor driver 43, a CPU (Central Processing Unit) 41, and an interface circuit 51.

The motor driver 43 controls a motor (not shown) for adjusting the size of the aperture 22. The motor driver 43 also controls a motor (not shown) for actuating the quick return mirror 23 up and down between the two positions B1 and B2 shown in FIG. 1. The motor driver 43 further controls a motor (not shown) for actuating the focal plane shutter 24.

The CPU 41 is connected with the motor driver 43, the CCD driving circuit 44, the DSP 47, and the memory controller 48 in order to control them. The CPU 41 is also connected to the interface circuit 51 which is able to write/read data on/from the recording medium 100. The CPU 41 transfers the image data from the image data memory 50 to recoding medium 100, or vice versa, by controlling the memory controller 48 and the interface circuit 51.

The power circuit 42 supplies electricity from the battery 60 to the elements of the inner circuit 40 via power supply lines not shown in FIG. 2.

The ion generator 80 includes the high voltage circuit 83 and the inverter 84. The inverter 84 converts the direct current supplied from the battery 60 into alternating current.

A transformer of the high voltage circuit 83 raises the alternating voltage that the inverter 84 has outputted. The high voltage circuit 83 supplies the raised alternating voltage to the needle-shaped electrode 81 via a high-voltage cable C. Electric discharge occurs around the needle-shaped electrode 81 when the high voltage is supplied, and the discharge ionizes the air around the needle-shaped electrode 81.

The operation panel 70 is provided with various switches such as buttons, dials or the like for controlling the digital camera 1. The operation panel 70, in the present embodiment, is provided at least with a shutter release button 71, for actuating the focal plane shutter to capture an object image, and a neutralization button 72, for actuating the ion generator 80 to eliminate the static electricity from the low-pass filter 25a and/or the infrared-absorbing filter 25b.

The operation panel 70 sends electrical signals to the CPU 41 which indicates the state of the switches. The CPU 41 monitors the electrical signals to check whether one of the switches is operated by the camera user, When one of the switches is operated, then the CPU 41 sends a command to one or more devices connected to the CPU 41 to actuate the camera in accordance to the camera user's operation.

If the neutralization button 72 is pushed when the focal plane shutter 24 is in a charged state for taking a picture, that is, the leading blind is covering the space accommodating the low-pass filter 25a and infrared absorbing filter 25b, then CPU 41 reads from internal memory 49 a program for controlling the ion generator 80 and starts the ion generator controlling process by executing that program.

Figure 3:
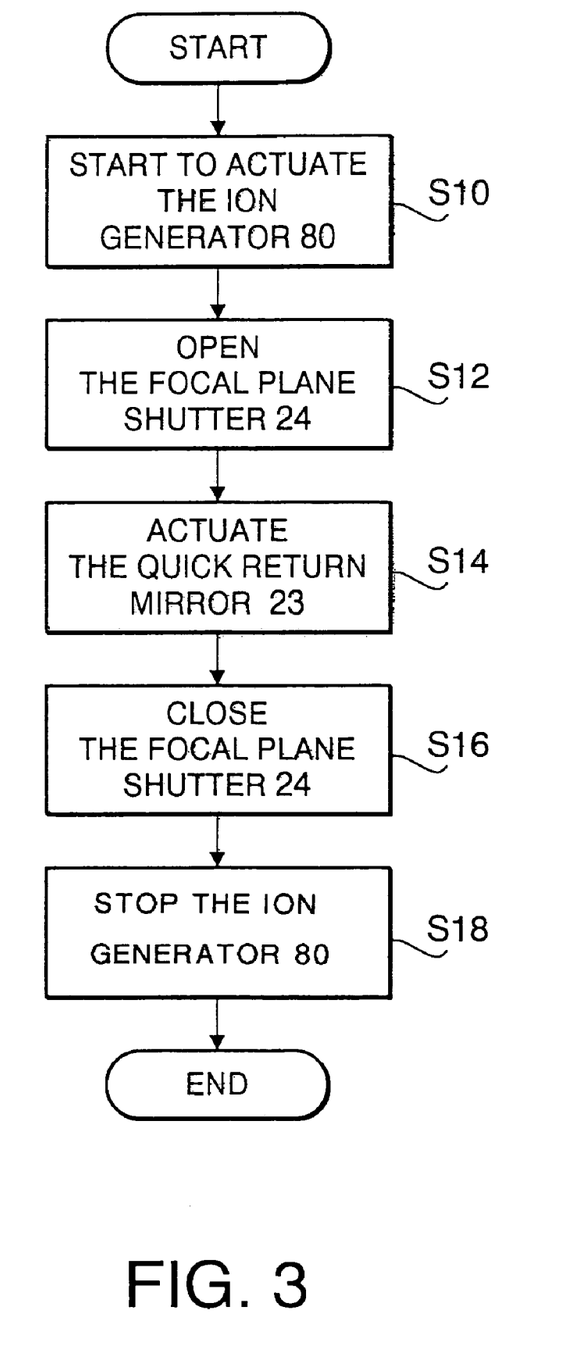
FIG. 3 shows a flowchart illustrating the ion generator controlling process.

FIG. 3 shows a flow chart illustrating the ion generator controlling process.

At step S10, the CPU 41 starts to actuate the ion generator 80 so that it produces ions. That is, the CPU 41 sends a command to the inverter 84, and the inverter 84 starts to convert the direct current from the battery 60 to the alternating current. Then, the high voltage circuit 83 raises the voltage of the alternating current outputted by the inverter, and applies the raised voltage to the needle-shaped electrode 81. Then the needle-shaped electrode 81 begins to discharge electricity and ionizes the surrounding air in positive or negative polarity. The ionized air diffuses gradually in the space including the quick return mirror 23 due to repulsion between the ions having the same polarity.

At step S12, the CPU 41 opens the focal plane shutter 24 by sending an appropriate command to the motor driver 43. The motor driver 43, on receiving the command from the CPU 41, drives the leading blind of the focal plane shutter in the direction away from the trailing blind so that the focal plane shutter 24 opens to its full width. As a result, the space accommodating the low-pass filter 25a and the infrared-absorbing filter 25b becomes in communication with the space accommodating the quick return mirror 23, which is normally shut off by the focal plane shutter 24 except at the moment of capturing an image, or an exposure. After the focal plane shutter 24 is opened, the ionized air can diffuse into the space between the focal plane shutter 24 and the CCD image sensor 26, and bind with the charges carried by the low-pass filter 25a, the infrared-absorbing filter 25b and other members existing in that space.

At step S14, the CPU 41 actuates the quick return mirror 23, up and down between the two positions B1 and B2 shown in FIG. 1 for one or more times. The CPU 41 achieves the above by sending an appropriate command to the motor driver 43 which drives in turn the motor for actuating the quick return mirror 23. The quick return mirror stirs the air inside the camera body 10 by the up and down movement. Accordingly, the ionized air around the needle-shaped electrode 82 of the ion generator 80 spreads rapidly and widely into the space between the focal plane shutter 24 and CCD image sensor 26.

At step S16, the CPU 41 closes the focal plane shutter 24 by sending again a command to the motor driver 43. The motor driver 43 controls the motor for actuating the focal plane shutter 24 such that the leading blind moves towards the trailing blind and shut the shutter again. As a result, the focal plane shutter 24 is set in a state ready for taking a picture.

At step S18, the CPU 41 stops the ion generator 80 from generating ions by sending a command to the inverter 84. The inverter 84 stops converting the current, and thus, the ion generator stops generating the ions.

As described above, the ionized air is introduced into the space accommodating the low-pass filter 25a and the infrared-absorbing filter 25b when the camera user pushes a neutralization button 72. The ionized air eliminates the static electricity from the filters 25a and 25b. Accordingly, less dust inside the camera body 10 is attracted to the filters 25a, 25b and the quality of the object image obtained by CCD image sensor 26 is less deteriorated by dust. Further, the dust adhering on the low-pass filter 25a and infrared-absorbing filter 25b can easily be removed.

Figure 4:
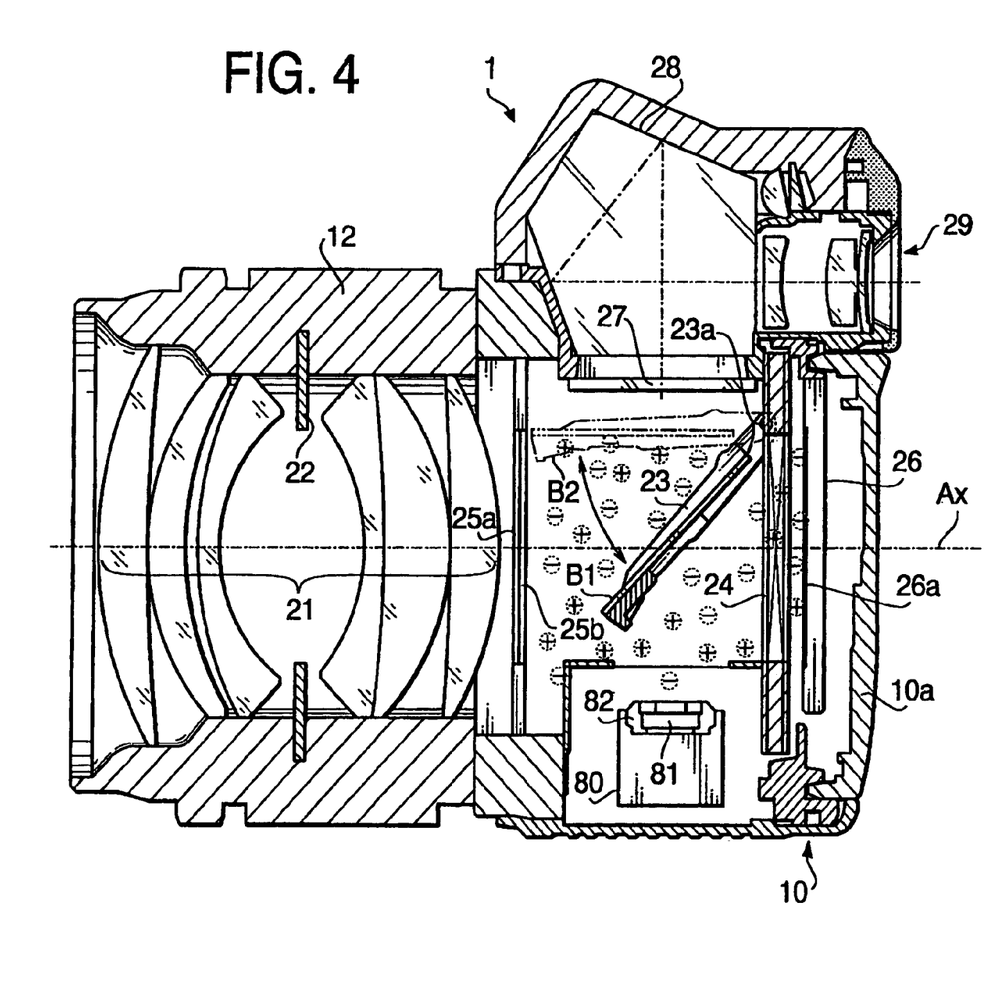
FIG. 4 schematically shows a cross-section of a digital camera according to a second embodiment of the present invention.

FIG. 4 schematically shows a cross-sectional view of an digital camera 2 according to a second embodiment of the present invention.

The digital camera 2 has the same configuration as that of the digital camera 1 of the first embodiment except that the low-pass filter 25a and the infrared-absorbing filter 25b are disposed between the lens system 21 and the quick return mirror 23, and that the ion generator 80 is disposed such that the tip of the needle-shaped electrode 81 is directed toward the quick return mirror 23 so that the opening defined at the top of the electrode 82 faces the quick return mirror 23.

Similar to the first embodiment, the air around the needle-shaped electrode 81 is ionized and diffuses into the space accommodating the quick return mirror 23 when the neutralization button 72 is pushed by the camera user. Further, the focal plane shutter 24 fully opens its slit by moving the leading blind in the direction away from the trailing blind, and the quick return mirror 23 moves up and down one or more times.

The air ionized by the ion generator 80 is stirred by the quick return mirror 23 and spreads toward the low-pass filter 25a, the infrared-absorbing filter 25b, and the CCD image sensor 26. Then the ions take off the static electricity on the filters 25a and 25b, and the CCD image sensor 26 by binding with the charges carried by them. As a result, the dust floating in the camera body 10 becomes less likely to be attracted to the low-pass filter 25a, the infrared-absorbing filter 25b, and the light receiving surface 26a. Accordingly, the object image obtained by the CCD image sensor 26 is less deteriorated by dust.

It should be noted that the opening of the focal plane shutter is not indispensable and could be omitted in the second embodiment of the present invention, since the ionized air can still diffuse to the low-pass filter 25a and/or the infrared-absorbing filter 25b even if the focal plane shutter is kept close.

Figure 5:
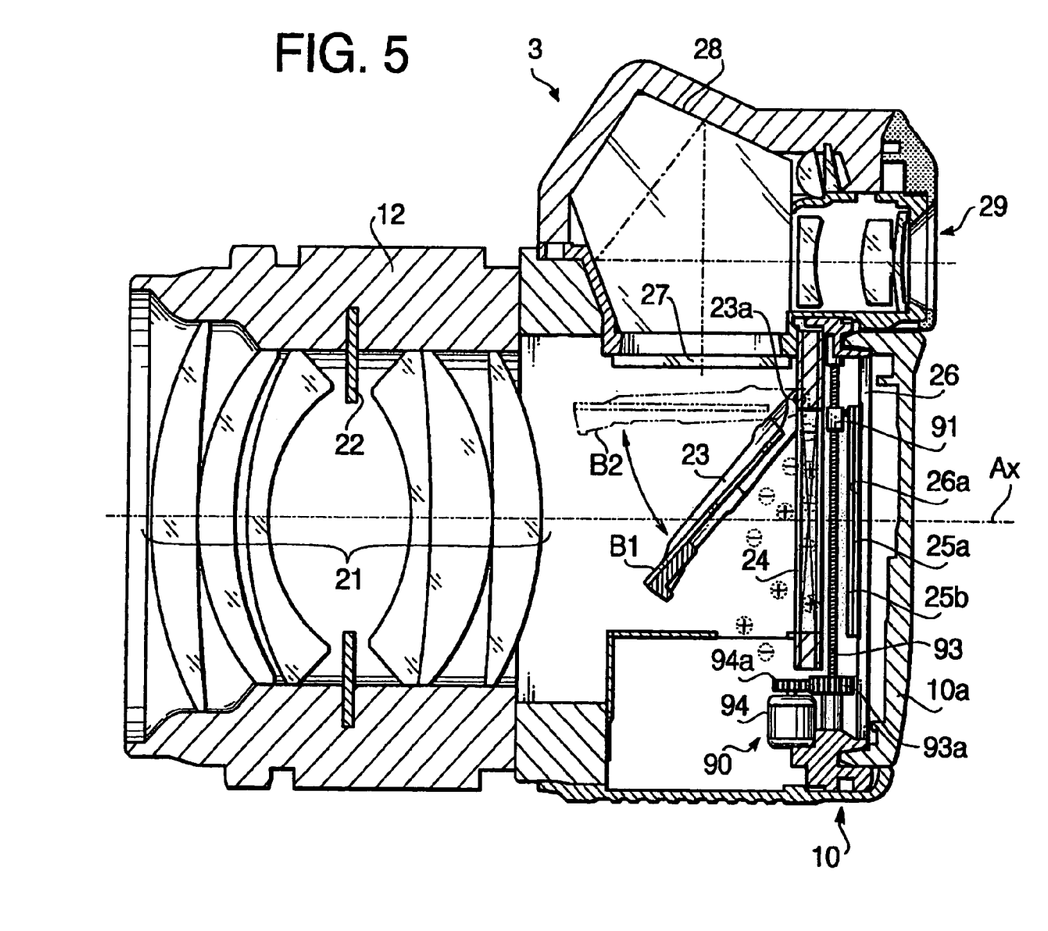
FIG. 5 schematically shows a cross-section of the digital camera according to the third embodiment of the present invention.

FIG. 5 schematically shows a cross-section of digital camera 3 according to a third embodiment of the present invention. The digital camera 3 has the same configuration as that of the digital camera 1 of the first embodiment except that a brushing device 90 for eliminating electric charges is disposed, instead of the ion generator 80, between the focal plane shutter 24 and the low-pass filter 25a. The digital camera 3 further differs from the digital camera 1 on the point that the low-pass filter 25a and the infrared-absorbing filter 25b are laminated to each other and then fixed on the light receiving surface 26a by means of adhesion.

Figure 6:
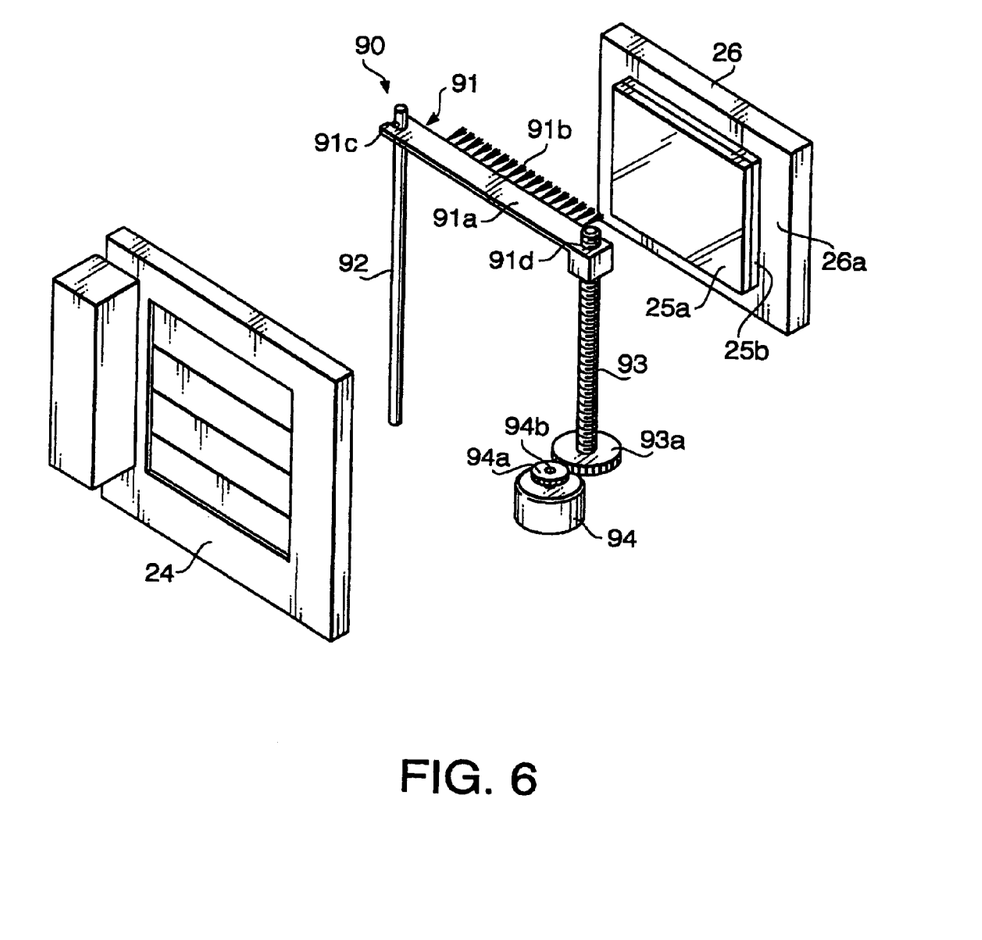
FIG. 6 shows the perspective view of a focal plane shutter, a brushing device, and a CCD image sensor with a low-pass filter and infrared-absorbing filter fixed thereon.

FIG. 6 shows the perspective view of the focal plane shutter 24, the brushing device 90, and the CCD image sensor 26 with the low-pass filter 25a and infrared-absorbing filter 25b fixed thereon. In FIG. 6, the focal plane shutter 24, the brushing device 90, and the CCD image sensor 26 are shown space apart to each other in the direction of the optical axis Ax for Illustrative purpose only.

The brushing device 90 includes a brush 91, a supporting shaft 92, a driving shaft 93 and a motor 94.

The supporting shaft 92 and the driving shaft 93 are disposed between the focal plane shatter 24 and the CCD image sensor 26. Further, the supporting shaft 92 and the driving shaft 93 are disposed parallel to each other and to the low-pass filter 25a, and are preferably disposed vertically. The supporting shaft 92 and the driving shaft 93 are spaced apart, from each other, a distance longer than the width of the low-pass filter 25a and arranged to both sides of the passage of the light incident on the low-pass filter 25a.

A screw thread is formed on the driving shaft 93, while the surface of the supporting shaft 92 is formed smooth.

A spool gear 93a is disposed on the lower end of the driving shaft 93. The motor 94 is provided with a pinion gear 94a, on top of a rotating shaft 94b, which is engaged with the spool gear 93a. Accordingly, the driving shaft 93 rotates about its longitudinal axis when the motor 94 actuates.

The brush 91 includes a plate 91a and a plurality of fibers 91b. The plate 91a has practically a rectangular shape. The fibers 91b are fixed to the longer side edge of the plate 91a that faces the low-pass filter 25a. The fibers 91b are fixed to the plate 91a in constant interval and such that each fiber protrudes from the plate 91a toward the low-pass filter 25a.

The longer side of the plate 91a has a dimension substantially same as the distance between the supporting shaft 92 and the driving shaft 93, that is, longer than the width of the light receiving surface 26a of the CCD image sensor 26. A recess 91c is provided to one of the shorter sides of the plate 91a and a threaded hole 91d is provided to the area near the other shorter side of the plate 91a.

The recess 91c is engaged with the supporting shaft 92 slidably along the longitudinal axis of the supporting shaft 92. The threaded hole 91d is screw coupled with the driving shaft 93. Thus, the plate 91a is supported parallel to the low-pass filter 25a, at a position where the fibers 91b are in contact with the low-pass filter 25a, between the focal plane shutter 24 and the low-pass filter 25a. When the driving shaft 93 rotates about its longitudinal axis, the plate 91a moves along the driving shaft 93 by being guided by the supporting shaft 92 at the recess 91c. Thus, the plate 91a moves up and down in front of the low-pass filter 25a by keeping its longer side parallel to the low-pass filter 25a and also keeping the fibers 91b in contact with the low-pass filter 25a.

The plate 91a and the fibers 91b are made from conductive material, while the supporting shaft 92 is also made from a conductive material and is grounded (i.e., connected to a chassis (not shown) of the digital camera 3). Accordingly, the plate 91a, which is in contact with the supporting shaft 92 at the recess 91c, and the fibers, fixed to the plate 91a, are also grounded.

Figure 7:
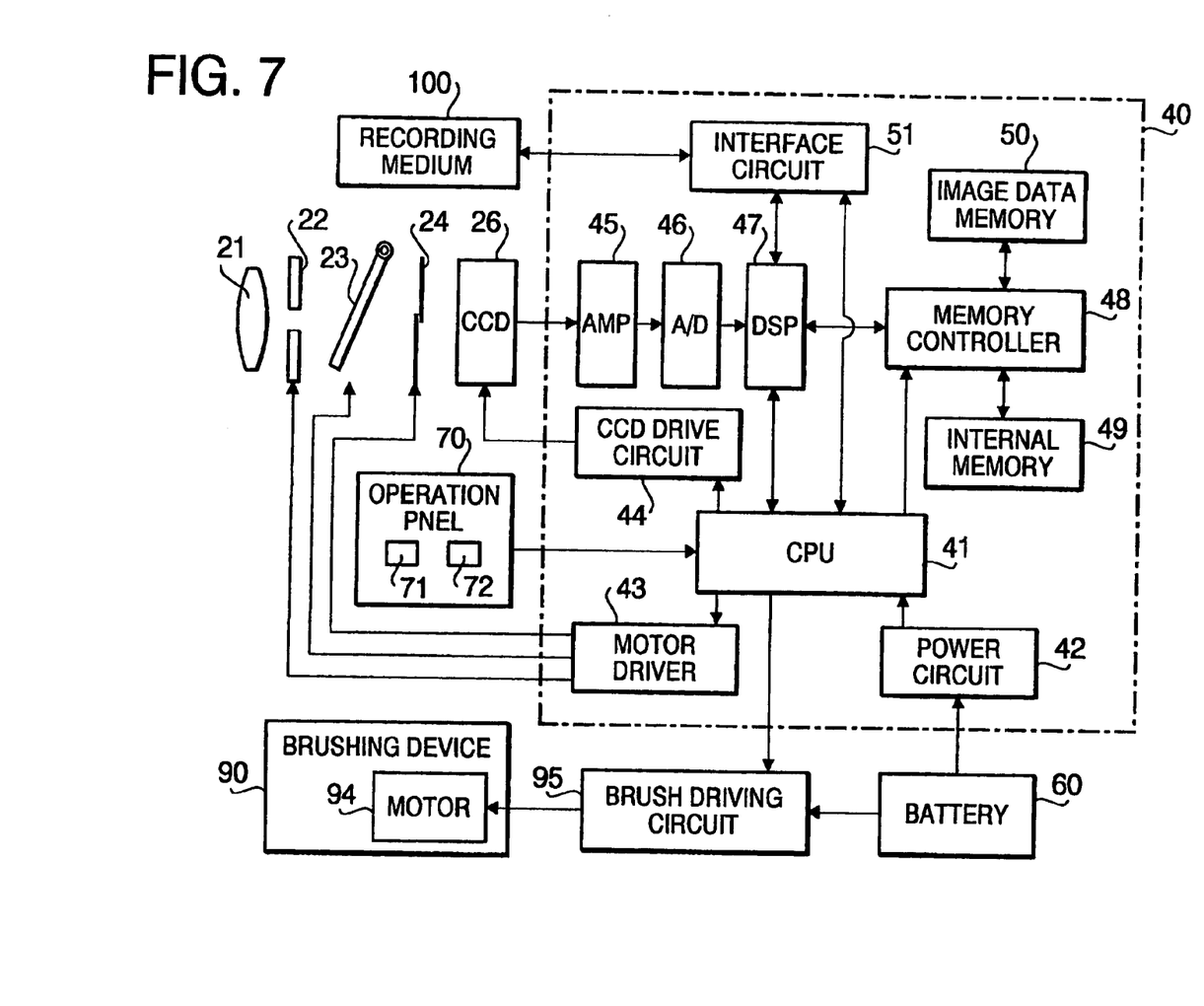
FIG. 7 shows a block diagram of the digital camera according to the third embodiment of the present invention.

FIG. 7 shows a block diagram of the digital camera 3. The block diagram shown in FIG. 7 is similar to that of FIG. 2 except that it includes, instead of ion generator 80, the brushing device 90 and a brush driving circuit 95 for driving the motor 94 of the brushing device 90. The brush driving circuit 95 is connected to the battery 60 for being supplied power, and is also connected to the CPU 41 for being controlled.

The CPU 41 sends a command to the brush driving circuit 95 to start actuating the brushing device 90 when the neutralization button 72 is pushed by a camera user. Then, the brush driving circuit 95 actuates the motor 94 such that the brush 91 moves from a first position, which is slightly higher than the upper edge of the light receiving surface 26*a*, to a second position, which is slightly lower than the lower edge of the light receiving surface 26*b*. The brush driving circuit 95 actuates the motor 94 such that the brush 91 moves from the second position up to the first position when the neutralization button 72 is operated for the next time. The brush driving circuit 95 may also actuate the motor 94 such that the brush 90 reciprocate between the first and second position each time when the neutralization button 72 is operated.

When the brush 91 moves up and down, the fibers 91*b* traverse over the surface of the low-pass filter 25*a*. Thus the low-pass filter 25*a* discharges the electric charges through the fibers 91*b* to the ground. At the same time, the dust on the low-pass filter 25*a* is wiped away by the fibers 91*b*.

Preferably, the brush driving circuits 95 actuates the motor 94, after the up and down movement above is finished, such that the fibers 91*b* are located at a position where they are out of the passage of the light incident on the light receiving surface 26*a*, but still in contact with the low-pass filter 25*a*, e.g. at the edge portion of the low-pass filter 25*a* as is shown in FIG. 5. Thus, the brushing device 90 keeps discharging the electric charges from the surface of the low-pass filter even when neutralization button 72 is pushed.

As is described above, the electric camera 3 includes the brushing device 90 that takes off both the electric charges and the dust from the low-pass filter 25*a*. Accordingly, the electric camera 3 prevents deterioration of quality of the object image obtained by the CCD image sensor 26, which is caused by the dust adhered on the low-pass filter 25*a* due to the static electricity.

It is to be understood that even though numerous characteristics and advantages of the present invention have been set forth in the foregoing description, together with details of the structure and functions of the invention, the disclosure is illustrative only, and changes may be made.

A fan or blower, for example, may be provided in the camera body 10 of the digital camera 1, which stirs the air inside the camera body 10 such that the air ionized by the ion generator 80 spreads rapidly toward the low-pass filter 25*a* and/or the infrared-absorbing filter 25*b*. The CPU 41 may actuate the fan or blower instead of actuating the quick return mirror up and down during the ion generator controlling process.

Further, the CPU 41 may start to execute the ion generator controlling process, or actuate the brushing device 90, when the shutter release button 71 is operated, instead of when the neutralization button 72 is operated. In such a case, the CPU 41 may execute the ion generator controlling process, or drive the brushing device 90, just before or after the shutter 24 is released for exposing the CCD image sensor 26 to the object image. The CPU 41 may also drive the brushing device 90 during when the quick return mirror is moving up before the shutter release, or moving down after the shutter release.

Furthermore, the shutter release button 71 may have first and second positions to which it is pushed down, and the CPU 41 may control the ion generator 80 or the brushing device 90 to operate when the shutter release button 71 is pushed down to the first position (pushed halfway), while controlling the CCD driving circuit 44 to operate, in order to take a picture, when the shutter release button 71 is pushed down to the second position (i.e., fully depressed).

Further, the CPU 41 may also start to execute the ion generator controlling process, or actuate the brushing device 90, when a power switch of the digital camera is switched on.

The present disclosure relates to the subject matter contained in Japanese Patent Application No. P2000-180040, filed on Jun. 15, 2000, which is expressly incorporated herein by reference in its entirety.

What is claimed is:

1. An electronic camera, comprising:
    at least one optical element disposed in said electronic camera, and
    a charge eliminating device for eliminating static electric charges from said optical element, said charge eliminating device including an ion generator for ionizing the air inside said electronic camera.

2. The electronic camera according to claim 1, further comprising:
    a manually operable switch, and
    a controller for controlling said charge eliminating device to operate in response to operation of said manually operable switch.

3. The electronic camera according to claim 2, wherein a predetermined operation related to image capture is initiated in response to operation of said manually operable switch.

4. The electronic camera according to claim 3, wherein, said switch is a shutter release button.

5. The electronic camera according to claim 1, further comprising:
    a stirring mechanism for stirring the air inside said electronic camera, wherein
    the ionized air is stirred by said stirring mechanism and spreads toward said optical element.

6. The electronic camera according to claim 5, wherein said electronic camera is a single-lens reflex camera having a quick return mirror, and said stirring mechanism includes said quick return mirror and actuates said quick return mirror for stirring the air inside said electronic camera.

7. The electronic camera according to claim 5, wherein said ion generator has an opening facing toward said stirring mechanism, and the ionized air diffuses from said opening toward said stirring mechanism.

8. The electronic camera according to claim 1, further comprising:
    an image-pickup device for converting an object image formed thereon into electrical signals; and
    a mechanical shutter for controlling the exposure time of said image-pickup device, said mechanical shutter disposed between said optical element and said charge eliminating device; wherein
    said mechanical shutter opens while said charge eliminating device operates.

9. The electronic camera according to claim 8, further comprising:
    a stirring mechanism for stirring the air inside said electronic camera, whereby the ionized air spreads through said mechanical shutter toward said optical element.

10. The electronic camera according to claim 9, wherein said electronic camera is a single-lens reflex camera having a quick return mirror, and said stirring mechanism includes said quick return mirror and actuates said quick return mirror for stirring the air inside said electronic camera.

11. The electronic camera according to claim 1, wherein said optical element is made from ferroelectric material.

12. The electronic camera according to claim 11, wherein said optical element is an optical low-pass filter.

13. The electronic camera according to claim 1, wherein said optical element is an infrared-absorbing filter.

14. The electronic camera according to claim 1, wherein said optical element is an image-pickup device.

15. An electronic camera comprising:
   at least one optical element disposed in said electronic camera,
   a charge eliminating device for eliminating static electric charges from said optical element,
   a manually operable switch which is a shutter release button,
   a controller for controlling said charge eliminating device to operate in response to operation of said manually operable switch, and
   an image-pickup device for converting an object image formed thereon into electrical signals,
   wherein a predetermined operation related to image capture is initiated in response to operation of said manually operable switch, and said shutter release button has first and second positions to which it is pushed down, said charge eliminating device operates when said shutter release button is pushed down to said first position, while said image-pickup device operates when said shutter release button is pushed down to said second position.

16. An electronic camera, comprising:
   at least one optical element disposed in said electronic camera;
   a charge eliminating device for eliminating static electric charges from said optical element, said charge eliminating device including a brushing device having a conductive and grounded brush, said brush traversing over a surface of said optical element while keeping contact with said optical element to ground said optical element;
   a manually operable switch; and
   a controller for controlling said brushing device to move said brush across the surface of said optical element in response to operation of said manually operable switch.

17. The electronic camera according to claim 16, further comprising:
   a brush driver that causes said brushing device to traverse the surface of said optical element while said optical element is fixed in place.

18. The electronic camera according to claim 17, wherein said optical element is an image-pickup device.

19. The electronic camera according to claim 16, wherein said brush is located in a position, when said manually operable switch is not operated, where said brush contacts said optical element and is out of a passage of a light for forming an object image to be taken as a picture.

20. An electronic camera, comprising:
   at least one optical element disposed in said electronic camera;
   a charge eliminating device for eliminating static electric charges from said optical element, said charge eliminating device including a brushing device having a conductive and grounded brush, said brush traversing over a surface of said optical element while keeping contact with said optical element to ground said optical element;
   a manually operable switch; and
   a controller for controlling said charge eliminating device to operate in response to operation of said manually operable switch.

21. The electronic camera according to claim 20, wherein a predetermined operation related to image capture is initiated in response to operation of said manually operable switch.

22. The electronic camera according to claim 21, wherein, said switch is a shutter release button.

23. An electronic camera, comprising:
   at least one optical element disposed in said electronic camera; and
   a charge eliminating device for eliminating static electric charges from said at least one optical element, said charge eliminating device including a brushing device having a conductive and grounded brush, said brush traversing over a surface of said optical element while keeping contact with said optical element to ground said optical element,
   wherein said at least one optical element is made from ferroelectric material.

24. The electronic camera according to claim 23, wherein said optical element is an optical low-pass filter.

25. An electronic camera, comprising:
   at least one optical element disposed in said electronic camera; and
   a charge eliminating device for eliminating static electric charges from said at least one optical element, said charge eliminating device including a brushing device having a conductive and grounded brush, said brush traversing over a surface of said optical element while keeping contact with said optical element to ground said optical element,
   wherein said at least one optical element is an infrared-absorbing filter.

* * * * *